United States Patent
Drader (10) Patent No.: US 9,006,641 B2
(45) Date of Patent: Apr. 14, 2015

(54) DEVICE FOR DETECTING AN OBJECT USING SPAD PHOTODIODES

(71) Applicant: STMicroelectronics (Grenoble 2) SAS, Grenoble (FR)

(72) Inventor: Marc Drader, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 312 days.

(21) Appl. No.: 13/736,823

(22) Filed: Jan. 8, 2013

(65) Prior Publication Data

US 2013/0175435 A1 Jul. 11, 2013

(30) Foreign Application Priority Data

Jan. 9, 2012 (FR) ...................................... 1250216

(51) Int. Cl.
 *G06M 7/00* (2006.01)
 *G01C 3/08* (2006.01)
 *G01S 17/10* (2006.01)
 *G01S 7/486* (2006.01)
 *G01S 7/497* (2006.01)

(52) U.S. Cl.
 CPC . *G01C 3/08* (2013.01); *G01S 17/10* (2013.01); *G01S 7/4861* (2013.01); *G01S 7/497* (2013.01)

(58) Field of Classification Search
 CPC .................................. G01C 3/08; G01S 7/497
 See application file for complete search history.

(56) References Cited

U.S. PATENT DOCUMENTS

| | | | | |
|---|---|---|---|---|
| 5,103,085 A | * | 4/1992 | Zimmerman | ................. 250/221 |
| 5,455,669 A | | 10/1995 | Wetteborn | |
| 8,338,858 B1 | | 12/2012 | Bastiaans et al. | |
| 2005/0213074 A1 | | 9/2005 | Hoashi | |
| 2006/0202129 A1 | | 9/2006 | Niclass et al. | |
| 2011/0240865 A1 | | 10/2011 | Frach et al. | |

FOREIGN PATENT DOCUMENTS

| | | |
|---|---|---|
| JP | 2001-318146 A | 11/2001 |
| WO | 2011/029645 A1 | 3/2011 |

OTHER PUBLICATIONS

Stoppa et al., *A Single-Photon-Avalanche-Diode 3D Imager*, Proceedings of ESSCIRC, Grenoble, France, 2005, pp. 487-490.

\* cited by examiner

*Primary Examiner* — Thanh Luu
(74) *Attorney, Agent, or Firm* — Seed IP Law Group PLLC (57) ABSTRACT

The disclosure relates to a method for detecting the presence of an object near a detection device, comprising: emitting pulses of an incident photon beam, detecting photodiodes which trigger avalanche after the reception by the photodiode of at least one photon of a reflected photon beam produced by a reflection of the incident beam on an object near the detection device, determining a distance between the photodiodes and an object in a detection area, as a function of the time between a transmit time of the incident beam and avalanche triggering times of the photodiodes, and correcting the distance determined as a function of a calibration measurement obtained in the absence of object in the detection area, to compensate for photon reflections on a transparent plate arranged between the photodiodes and the detection area.

16 Claims, 4 Drawing Sheets

DEVICE FOR DETECTING AN OBJECT USING SPAD PHOTODIODES

BACKGROUND

1. Technical Field

The present disclosure relates to a device for detecting and measuring the distance from an object, based on a propagation time of a photon beam emitted in the form of pulses and reflected on the object. The present disclosure applies in particular to touch screens such as those used in mobile phones, and to the detection of an object near such a screen.

2. Description of the Related Art

It is known to use photodiodes as a distance detection and measurement element, using an avalanche phenomenon which may occur in the PN junctions of photodiodes. An avalanche phenomenon may occur in a diode PN junction when the diode is reverse biased near the junction breakdown voltage. This phenomenon can be used in two ways in an avalanche photodiode. If the avalanche photodiode is reverse biased just below the breakdown voltage, the photodiode then generates an electric current proportional to the intensity of the photon flux received by the photodiode, with a gain of some hundreds with a semiconductor such as silicon.

To detect low intensities of photon flux, it is known to use photodiodes which may be reverse biased above the breakdown voltage. Such photodiodes are called Single Photon Avalanche Diode (SPAD) or diodes operating in "Geiger" mode. Each time such a photodiode receives a photon, an avalanche phenomenon occurs in the photodiode PN junction, generating an intense current. To avoid destructing the photodiode by this intense current, the photodiode is connected to a quenching circuit allowing the avalanche process to be stopped some nanoseconds after appearing.

To perform a distance measurement, it is known to light a detection area with a pulsed light source such as a pulsed laser source, and to detect photons reflected by an object present in the detection area using a set of SPAD photodiodes. The distance from the object in the detection area is evaluated based on the propagation time or Time Of Flight (TOF) between the transmit time of a light pulse and the receipt time of a pulse across a photodiode, resulting from the photodiode avalanche triggering. The measure accuracy depends in particular on the duration of the light pulses emitted by the source; the shorter these pulses, the more accurate the measurement.

In applications to the detection of an object near a touch screen, the photodiodes are placed under a plate transparent to the photons to be detected. The plate may reflect photons emitted by the source directly towards the photodiodes, which disturbs the distance measurement. Indeed, if an object is at a distance D from the photodiodes and if the plate is at a distance d from the photodiodes, the photodiodes are going to detect photons from a reflection of the photon beam emitted on the object and also on the plate. If the measure of a distance is evaluated on the basis of an average of the photodiode triggering times, the obtained measure will be around (D+d)/2, i.e., half the distance D if the distance d is small. If there is no object in the detection area, the detection device supplies an incorrect distance measure equal to d.

To reduce the influence of reflections on the plate of photons emitted by the source, the photon beam transmit unit may be moved away from the photodiodes. However, this arrangement can reduce a detection area which coincides with the largest possible area lighted by the source.

BRIEF SUMMARY

One embodiment of the present disclosure is directed to a transparent plate on a set of single photon avalanche photodiodes (SPAD) photodiodes used to measure a time of flight. An arrangement of the transparent plate is configured to prevent distance measurements from being disturbed by the transparent plate arranged on the photodiodes in a proximity sensor using SPAD photodiodes.

Embodiments relate to a method for detecting an object near a detection device, comprising: reverse biasing single photon avalanche photodiodes, to a bias voltage greater than a breakdown voltage of a PN junction of each photodiode, emitting pulses of an incident photon beam, detecting photodiodes which avalanche trigger after the reception by the photodiode of at least one photon of a reflected photon beam produced by a reflection of the incident beam on an object near the detection device, determining a distance between the photodiodes and an object in a detection area, as a function of the time between a transmit time of the incident beam and avalanche triggering times in the photodiodes after receiving at least one photon of the reflected beam, and correcting the distance determined as a function of a calibration measurement obtained in the absence of object in the detection area, to compensate at least partially for photodiode avalanche triggering produced by photons of the incident beam reflected by a transparent plate arranged between the photodiodes and the detection area.

According to an embodiment, the correction is applied to the determined distance, considering that the numbers of photodiodes avalanche triggering by a photon reflected on the plate and by a photon reflected by the object, are equal.

According to an embodiment, the correction is applied to the determined distance, taking into account a number of photodiodes avalanche triggering by a photon reflected on the plate, obtained in calibration, and a number of photodiodes avalanche triggering by a photon reflected by the object.

According to an embodiment, the method comprises measuring a number of photodiodes avalanche triggering during a measurement cycle, and if the measured number is lower than a threshold value, it is considered that no object is in the detection area.

According to an embodiment, the method comprises optically coupling single photon avalanche photodiodes of a reference set to a source of photons emitting the incident photon beam, reverse biasing the photodiodes of the reference set, to the bias voltage, and determining average times of avalanche triggering in the photodiodes of the reference set, the distance being determined as a function of the average avalanche triggering times in the photodiodes of the reference set.

According to an embodiment, the method comprises generating a first signal at the transmit frequency of the pulses of the incident beam, synchronizing the start of each pulse of the first signal on an average avalanche triggering time in the photodiodes, generating a second signal having a determined state during a phase-shift period between the first signal and a third signal at the transmit frequency of the pulses of the incident beam, and when the first signal is synchronized, measuring a duration during which the second signal is in the determined state, a measure of distance with the object being determined as a function of the measured duration.

According to an embodiment, the third signal is a control signal for controlling a source emitting the incident beam.

According to an embodiment, the third signal is a signal which start of each pulse is synchronized on an average avalanche triggering time in reverse biased photodiodes of a reference unit optically coupled to the source emitting the incident beam, to determine transmit times of the pulses of the incident beam.

Embodiments relate to a device for detecting the presence of an object, comprising: a transmit circuit for emitting pulses of an incident photon beam, a detection circuit comprising several single photon avalanche photodiodes, and a voltage generation circuit for generating a bias voltage greater than a breakdown voltage of a PN junction of each photodiode, the detection device being configured to implement the method as above-defined.

According to an embodiment, the device comprises a reference detection circuit comprising several single photon avalanche photodiodes, optically coupled to the transmit circuit to detect a transmit time of each emitted pulse of the incident beam.

According to an embodiment, the device comprises a first synchronization circuit for synchronizing the start of each pulse of a first signal having the transmit frequency of the pulses of the incident beam, on an average avalanche triggering time in the photodiodes, the synchronization circuit comprising a phase shifter receiving in input a control signal for controlling a source emitting the incident beam, and supplying the first signal, two AND logic gates, each receiving in input the first signal and a detection signal comprising a pulse each time one of the photodiodes avalanche triggers, the output of the AND gates respectively controlling the charge or discharge of a capacitor whether a pulse of the detection signal appears during or outside a pulse of the first signal, the voltage across the capacitor controlling the phase shifter, the device comprising a comparator for comparing the first signal to a second signal having the frequency of the control signal, and a duration measurement circuit for measuring a duration in the high state of the output signal of the comparator.

According to an embodiment, the device comprises a second synchronization circuit for synchronizing the start of each pulse of the second signal having the transmit frequency of the pulses of the incident beam, on an average avalanche triggering time in reverse biased photodiodes of a reference unit optically coupled to the source emitting the incident beam, to determine transmit times of the pulses of the incident beam.

BRIEF DESCRIPTION OF THE SEVERAL VIEWS OF THE DRAWINGS

Embodiments of the disclosure will be described hereinafter, in relation with, but not limited to the appended figures wherein.

DETAILED DESCRIPTION

Figure 1:
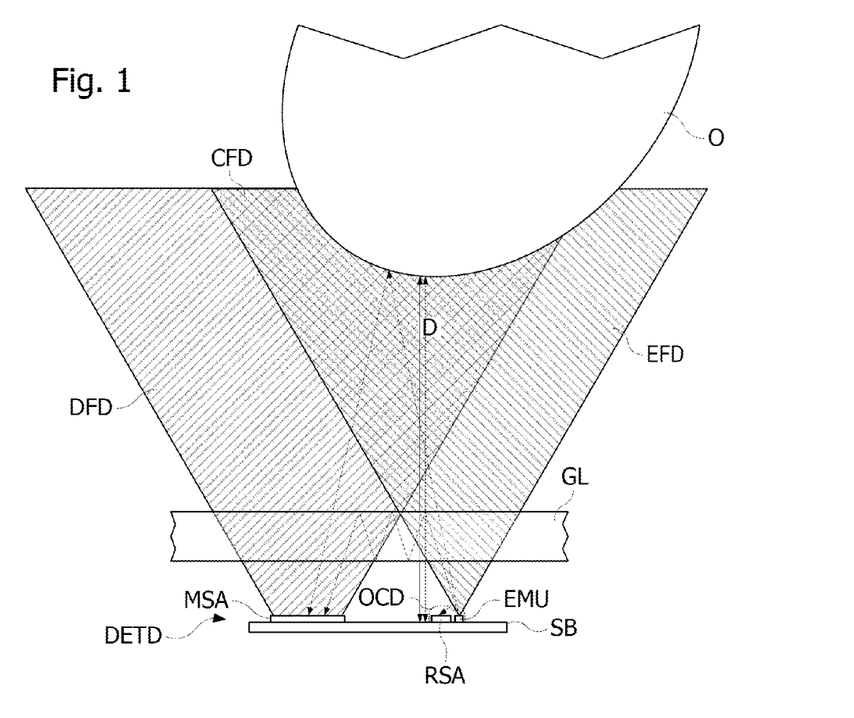
FIG. 1 schematically shows a device for detecting an object, according to one embodiment.

FIG. 1 shows a detection device DETD, according to one embodiment. Detection device DETD comprises a transmit unit EMU emitting photon pulses, a reception unit MSA, and a reference reception unit RSA, reception unit MSA and reference reception unit RSA being sensitive to the photon pulses emitted by transmit unit EMU. Transmit unit EMU, reception unit MSA, and reference reception unit RSA are formed on a wafer SB for example in a semiconductor material. Transmit unit EMU emits photon pulses in a transmit field EFD for example of conical shape whose top is centered on transmit unit EMU. Reception unit MSA is sensitive to photons coming from a detection field DFD which may also be of conical shape. Transmit field EFD and detection field DFD have a common area, forming a common detection field CFD in which an object O may be detected by detection device DETD by reflecting photons emitted by transmit unit EMU toward reception unit MSA.

Reference reception unit RSA is optically coupled to transmit unit EMU by an optical coupling device OCD configured to send toward reference reception unit RSA a part of the photons emitted by transmit unit EMU. Transmit unit EMU comprises one or more electroluminescent diodes or a laser diode emitting photon pulses in a certain wavelength range. Reception unit MSA may be associated with an optical filter letting photons belonging to the wavelength range of the transmit unit pass, excluding photons with other wavelengths. Wafer SB, transmit unit EMU, reception unit MSA, and reference reception unit RSA are covered by a plate GL in a material transparent to the wavelengths emitted by transmit unit EMU. Reception unit MSA, and possibly reference reception unit RSA comprises single photon avalanche photodiodes (SPAD), which are reverse biased to a bias voltage greater than the breakdown voltage of the PN junction of the photodiodes. Each time a photodiode of reception unit MSA or reference reception unit RSA triggers avalanche, it generates an electrical pulse. The wavelength range of the photons emitted by transmit unit EMU may be outside visible wavelengths, for example infrared or near infrared.

Photons of the transmit field EFD which reflect on the plate GL may reach reception unit MSA. Detecting such photons by reception unit MSA distorts the distance measures.

Figure 2:
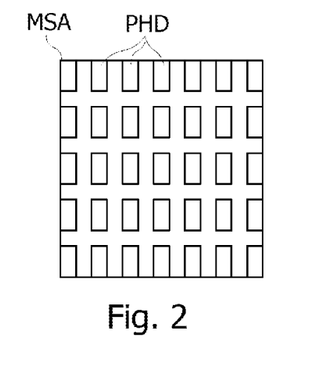
FIG. 2 shows a detection surface based on SPAD photodiodes, of the detection device.

FIG. 2 shows a detection surface of reception unit MSA. Reception unit MSA comprises several photodiodes PHD arranged according to a matrix distribution, in lines and columns transverse to lines. In the example of FIG. 2, reception unit MSA comprises 35 photodiodes PHD distributed on five lines and seven columns.

Figure 3:
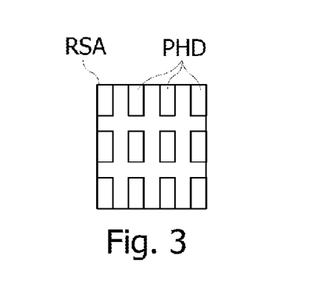
FIG. 3 shows a detection surface of a reference signal, based on SPAD photodiodes, of the detection device.

FIG. 3 shows a detection surface of reference reception unit RSA. Reference reception unit RSA comprises several photodiodes PHD arranged according to a matrix distribution, in lines and columns transverse to lines. In the example of FIG. 3, reference reception unit RSA comprises twelve photodiodes PHD distributed on three lines and four columns.

Detection device DETD measures the time between pulse receipt times in signals from the photodiodes of reference reception unit RSA and pulse receipt times in signals from the photodiodes of reception unit MSA. A distance between the object O and detection device DETD may then be deduced from the time between these receipt times, corresponding to the propagation time of the light emitted by transmit unit EMU to reflect on the object O, and reach reception unit MSA. To that end, detection device DETD may be configured to count a number of pulses by cycle of a clock signal in detection signals supplied by reception unit MSA and reference reception unit RSA. Each pulse in these detection signals corresponds to a photodiode PHD avalanche triggering after receiving a photon. The pulse count data are used to constitute for each measurement cycle triggered by the emission of a photon pulse by transmit unit EMU, a histogram comprising a number of photodiodes PHD avalanche triggering by clock cycle. Each measurement cycle spreads on several clock cycles and may last some nanoseconds, for example between 5 and 15 ns, for example 10 ns, to detect an object at less than 20 cm from the detection device. Indeed, the light propagation time to reflect on an object located at 10 cm from reception unit MSA and reach it, is around 0.666 ns. Each histogram obtained may then be used to determine reception times, respectively by reference reception unit RSA and reception unit MSA, of the photon pulse emitted by transmit unit EMU. A distance from the object O which reflected the photon pulse emitted by transmit unit EMU to reception unit MSA, is then determined by calculating the time between the determined reception times. The distance to the object O may then be deduced by multiplying this time by the light speed divided by two, to take into account the light round trip.

Figure 4:
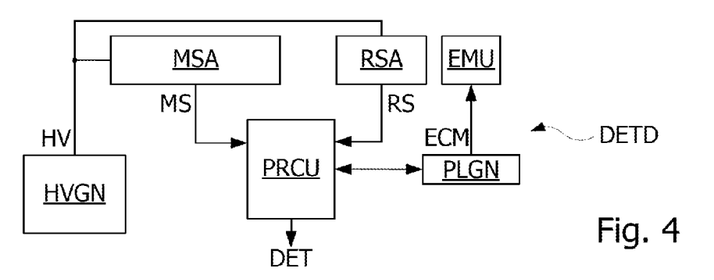
FIG. 4 schematically shows circuits of the detection device, according to one embodiment.

FIG. 4 shows circuits of the detection device DETD. Detection device DETD comprises, in addition to reception units MSA, reference reception unit RSA and transmit unit EMU, a process unit PRCU, a pulse generation circuit PLGN, and a high voltage generation circuit HVGN. High voltage generation circuit HVGN supplies a high voltage HV to reference reception unit RSA, reception unit MSA to reverse bias the photodiodes PHD of these units, to a voltage greater than the breakdown voltage of the PN junction of the photodiodes. Process unit PRCU supplies control signals to pulse generation circuit PLGN. Pulse generation circuit PLGN generates a signal ECM comprising periodic pulses, transmitted to transmit unit EMU to trigger the emission of a photon pulse at each pulse of signal ECM. Reference reception unit RSA and reception unit MSA supply measurement signals RS, MS transmitted to process unit PRCU. Each measurement signal RS, MS comprises a pulse each time a corresponding photodiode triggers avalanche after the photodiode receives a photon. Process unit PRCU processes measurement signals RS, MS, as previously described, to determine the presence of an object O in detection field DFD of reception unit MSA, and possibly to determine the distance between the object O and reception unit MSA.

High voltage generation circuit HVGN may comprise a charge pump CP to generate, from a supply voltage of detection device DETD, a sufficient high voltage HV to reverse bias photodiodes PHD of reception MSA and reference reception unit RSA, to a voltage greater than a breakdown voltage of the photodiodes. The voltage HV may be around 12 V to 17 V, for example 14 V, whereas the supply voltage of detection device DETD is around 2 to 5 V, for example 3 V.

Figure 5:
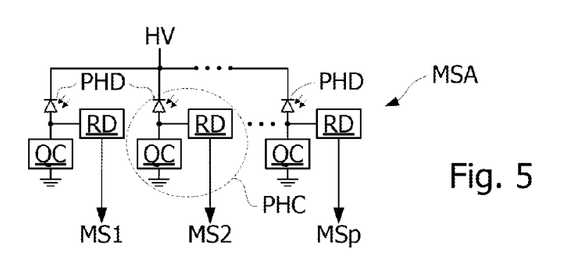
FIG. 5 schematically shows a detection unit of the detection device, according to one embodiment.

FIG. 5 shows reception unit MSA. Reception unit MSA comprises several photodiode circuits PHC, each comprising a photodiode PHD of single photon avalanche photodiodes (SPAD) type, a shaping circuit RD supplying a measurement detection signal MS1, MS2, . . . MSp, and an avalanche quenching circuit QC allowing the photodiode to be protected as soon as it avalanche triggers. The photodiode PHD of each photodiode circuit PHC comprises a cathode connected to one of lines HV1-HVn and an anode connected to the shaping circuit RD. The anode of the photodiode is also connected to the ground through a quenching circuit QC. Each measurement detection signal MS1-MSp is for example a binary signal comprising a pulse of fixed duration, whose start coincides with the time when the corresponding photodiode PHD avalanche triggers after receiving a photon. The duration of a pulse in measurement signals MS1-MSp may be fixed at a value between 1 and 3 ns. All the measurement signals MS1-MSp of FIG. 5 correspond to the measurement signals MS from reception unit MSA in FIG. 4. Quenching circuit QC may be a simple MOS transistor whose gate receives a control signal to control the transistor in the conductive state to reverse bias the photodiode so that it may detect a photon, and block the transistor when the diode PHD avalanche triggers.

Reference reception unit RSA may comprise photodiode circuits identical to those PHC of reception unit MSA, and each receiving the high voltage HV, directly from high voltage generation circuit HVGN, or through a switching circuit CCM (not shown). Measurement signals RS of FIG. 4 therefore comprise one signal per photodiode PHD in the reference reception unit RSA.

Figure 6A:
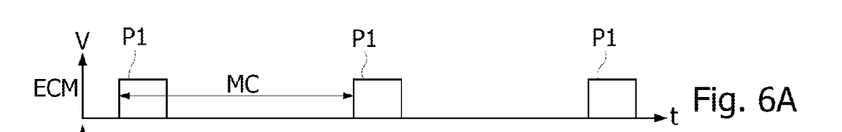
FIGS. 6A to 6E are timing diagrams showing the operation of the detection device, according to one embodiment.
Figures 6B, 6C:
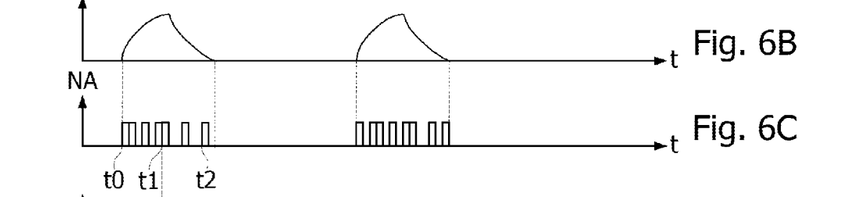
Figure 6D:
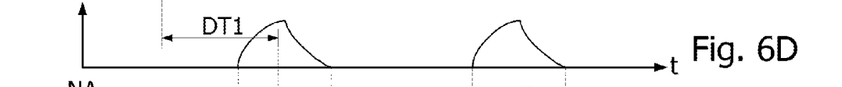
Figure 6E:
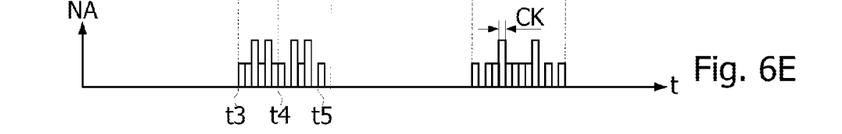

FIGS. 6A to 6E are timing diagrams showing the operation of detection device DETD. FIG. 6A shows periodic pulse signal ECM for triggering the emission of photon pulses by transmit unit EMU. FIGS. 6B and 6D show the photon flux emitted by transmit unit EMU, such as received by reference reception unit RSA and reception unit MSA. FIGS. 6C and 6E show histograms of the number NA of photodiodes triggering avalanche in reception unit MSA at each clock cycle of duration CK. The timing diagrams of FIGS. 6A to 6E have two measurement cycles MC, each delineated by two successive pulses P1 of the control signal of transmit unit EMU (FIG. 6A). Times t1, t4 of reception of a photon pulse by each reference reception unit RSA and reception unit MSA may be determined from start and end pulse reception times t0, t2 (for reference reception unit RSA) and t3, t5 (for reception unit MSA), by calculating an average of the start times t0, t3 and end times t2, t5, i.e., t1=t0+(t2−t0)/2 and t4=t3+(t5−t3)/2. Times t1, t4 may also be determined by a weighted average calculation, taking into account the number NA of photodiodes triggered at each clock cycle, supplied by the histogram. Thus, in the example of FIG. 6C, 7 photodiodes avalanche triggered in reference reception unit RSA between times t0 and t2, and time t2 is offset from time t0 by 14 clock cycles of duration CK. Time t1 may be obtained by a weighted average calculation, as follows:

$$t1 = t0 + 1/7 \times (CK + 3CK + 5CK + 6CK + 9CK + 12CK))$$
$$= t0 + 36/7 \times CK.$$

Likewise, in the example of FIG. 6D, fifteen photodiodes avalanche triggered in reception unit MSA between times t3 and t5, and time t5 is offset from time t3 by 13 clock cycles of duration CK. Time t4 may be obtained by a weighted average calculation, as follows:

$$t4 = t3 + 1/15 \times \begin{array}{l}(CK + 2(2CK) + 3CK + 2(4CK) + 5CK + \\ 6CK + 2(8CK) + 9CK + 2(10CK) + 12CK)\end{array}$$
$$= t3 + 84/15 \times CK.$$

Knowing times t1 and t4 then makes it possible to evaluate a propagation time DT1 (=t4−t1) of the photon pulse between transmit unit EMU (reference reception unit RSA) and reception unit MSA. Distance D between detection device DETD and object O may then be calculated as follows:

$D=DT1 \times c/2$, where $c$ is the light speed.

According to one embodiment, a calibration phase is performed to determine the contribution of plate GL on the number of photodiodes of reception unit MSA avalanche triggering. This phase, performed in the absence of object O in the detection field DFD, is to obtain a histogram of the number of photodiodes NA avalanche triggering as a function of time in reception unit MSA. The histogram is subtracted from the histogram obtained at each measurement cycle from the photodiodes of reception unit MSA, to obtain a corrected histogram on which the calculation of time t4 is made.

According to one embodiment, the number of photodiodes in avalanche in the corrected histogram is compared with a threshold value. If this number is lower than the threshold value, it is considered that the avalanche triggers are due to parasite photons coming in particular from reflections on the plate GL, and therefore there is no object in the detection field DFD.

Figure 7:
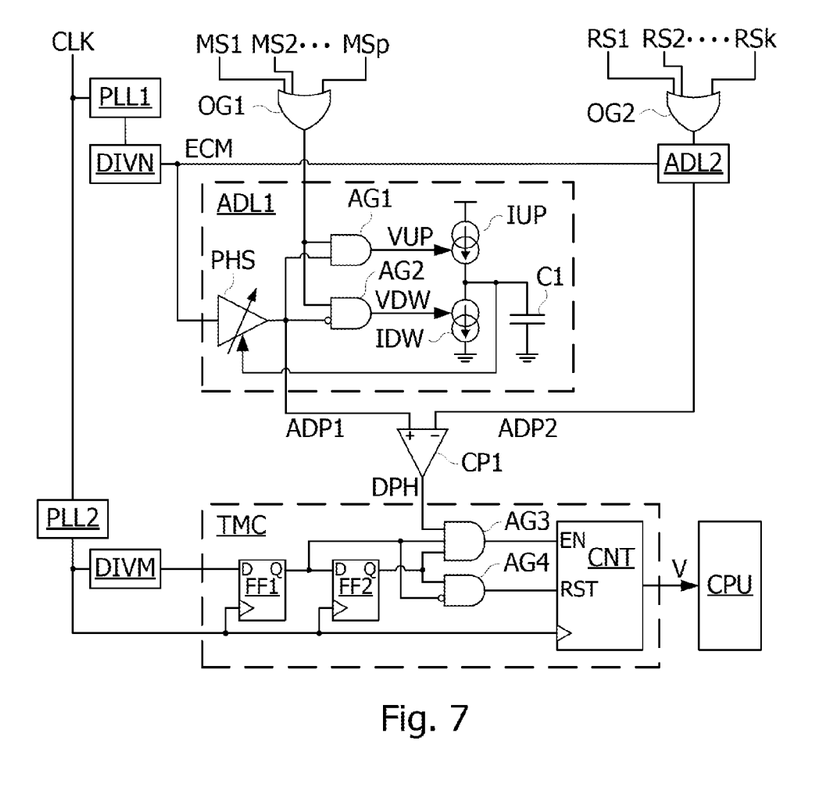
FIG. 7 shows circuits of the detection device, according to another embodiment.

FIG. 7 shows circuits of process unit PRCU, according to one embodiment that is configured to output a detection signal DET. In FIG. 7, process unit PRCU comprises two logic gates of OR type OG1, OG2, gate OG1 receiving measurement signals MS1-MSp and gate OG2 receiving measurement signals RS (RS1-RSk) from reference reception unit RSA. Process unit PRCU comprises two phase-locked loop circuits PLL1, PLL2, two frequency dividers DIVN, DIVM, two delay-locked loop analog circuits ADL1, ADL2, a comparator CP1, and a duration measurement circuit TMC.

A clock signal CLK is supplied to the inputs of phase-locked loop circuits PLL1, PLL2. Frequency divider DIVN is connected in input to an output of phase-locked loop circuit PLL1 and in output to an input of each delay-locked loop analog circuit ADL1, ADL2. Phase-locked loop circuits PLL1 and frequency divider DIVN allow periodic signal ECM for controlling transmit unit EMU to be generated. Phase-locked loop circuits PLL1 increases the frequency of clock signal CLK by a certain factor, and frequency divider DIVN divides the output frequency of phase-locked loop circuit PLL1 by a factor N, so that the periodic signal ECM has a frequency lower than the maximum avalanche triggering frequency in the photodiodes PHD. The output of gate OG1 is connected to an input of delay-locked loop analog circuit ADL1, and the output of gate OG2 is connected to an input of delay-locked loop analog circuit ADL2. Comparator CP1 receives in an input, an output signal ADP1, ADP2 from each delay-locked loop analog circuit ADL1, ADL2, and supplies a phase-shifting signal DPH between output signals ADP1, ADP2.

Delay-locked loop analog circuits ADL1, ADL2 are identical, only the internal circuits of delay-locked loop analog circuit ADL1 being shown in FIG. 7 for simplicity reasons. Thus, each delay-locked loop analog circuit ADL1, ADL2 comprises an adjustable phase-shifter circuit PHS, two logic gates of AND type AG1, AG2, two adjustable current sources IUP, IDW, and a capacitor C1. Signal ECM is provided to the input of phase-shifter circuit PHS. The output of phase-shifter circuit PHS which constitutes an output signal ADP1 of delay-locked loop analog circuit ADL1, is connected to a direct input of gate AG1 and an inverting input of gate AG2. The output of gate OG1 is connected to a direct input of each gate AG1, AG2. The output of gate AG1 controls the activation of current source IUP and the output of gate AG2 controls the activation of current source IDW. In other words, when one or the other gate AG1, AG2 is active, the current source to which the gate is connected is also active. Source IUP is connected between a supply voltage source and source IDW, and source IDW is connected between source IUP and the ground. The connection node between sources IUP, IDW is connected to a control input of phase-shifter circuit PHS and is connected to the ground through capacitor C1. The voltage across capacitor C1 therefore corresponds to that of the control signal of phase-shifter circuit PHS.

Figure 8:
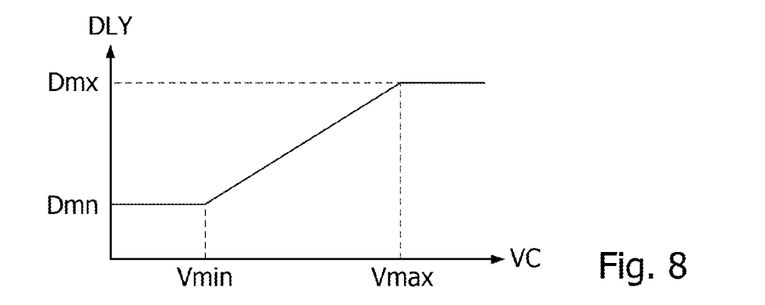
FIGS. 8 and 9 are curves showing the operation of the detection device, according to one embodiment.

FIG. 8 is a curve showing the operation of phase-shifter circuit PHS. This curve indicates the variations of the delay DLY applied by phase-shifter circuit PHS to signal ECM, as a function of the voltage VC across capacitor C1. The delay applied by phase-shifter circuit PHS is constant and equal to a minimum delay value Dmn, when voltage VC is lower than a minimum voltage value Vmin, and constant and equal to a maximum delay value Dmx when voltage VC is greater than a maximum voltage value Vmax. Between voltages Vmin and Vmax, the delay applied by phase-shifter circuit PHS varies linearly with a positive slope, between the delay values Dmn and Dmx. The delay values Dmn and Dmx may for example be defined as a function of minimum and maximum object detection distances. The value Dmn applied by phase-shifter circuit PHS to signal ECM may for example be equal to zero and the maximum delay value Dmx may be equal to the period of measurement MC, i.e., the period of signal ECM.

Figure 9:
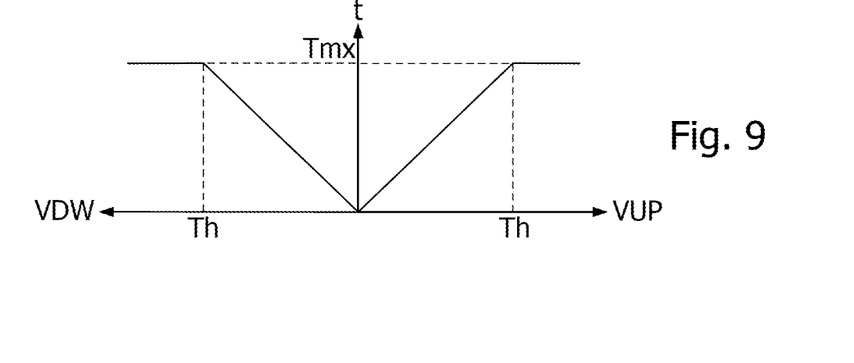

FIG. 9 is a curve showing the operation of the circuit comprising current sources IUP, IDW controlled by the outputs of gates AG1, AG2. The curve of FIG. 9 indicates the variations of the activation durations of current sources IUP, IDW as a function of the duration in the high state of output signals VUP, VDW of gates AG1, AG2. A threshold value Th defines the minimum time limit for which the duration of output signals VUP, VDW no longer affects the activation duration of the current sources which is then set to a maximum duration Tmx.

When current source IUP is activated by the output signal VUP of gate AG1, capacitor C1 charges, which increases the control voltage of phase-shifter circuit PHS. Conversely, when current source IDW is activated by the output signal VDW of gate AG2, capacitor C1 discharges, which decreases the control voltage of phase-shifter circuit PHS. When the duration in the high state of output signal VUP exceeds a certain duration threshold Th, current source IUP remains activated during a certain fixed duration Tmx. Likewise, when the duration in the high state of signal VDW exceeds the duration threshold Th, current source IDW remains activated during the fixed duration Tmx. If output signals VUP, VDW are in the high state for a duration lower than threshold Th, current sources IUP, IDW are activated for a duration proportional to this duration. Thus, during a period of signal ECM, if the output signals VUP, VDW are in the high state for a same duration, the amount of current injected into capacitor C1 may be equal to zero.

At each pulse emitted by a photodiode PHD of reception unit MSA, gate AG1 switches to the high state if output signal ADP1 is in the high state, which charges capacitor C1. Conversely, each pulse emitted by a photodiode PHD of reception unit MSA outside the pulses of output signal ADP1, discharges capacitor C1. If the numbers of pulses emitted by the photodiodes of reception unit MSA, during and outside the pulses of output signal ADP1, are equal, the charge of capacitor C1 does not change and therefore the phase-shift between signals ECM and output signal ADP1 is not modified by phase-shifter circuit PHS. The result is that at the end of a certain number of pulses of signal ECM, the phase-shift between signals ECM and output signal ADP1 tends to converge on a value such that the start of a pulse of output signal ADP1 is in the middle of the pulses emitted by the photodiodes of reception unit MSA, during a period of signal ECM. In other words, the start of each pulse of output signal ADP1 tends to be synchronized on an average pulse emitting time by the photodiodes of reception unit MSA.

Delay-locked loop analog circuit ADL2 operates like delay-locked loop analog circuit ADL1, with the pulses supplied by the photodiodes of reference reception unit RSA. The result is that after a certain number of pulses of signal ECM, the phase-shift between signal ECM and output signal ADP2 in output of delay-locked loop analog circuit ADL2, tends to converge on a fixed value such that the start of a pulse of output signal ADP2 is in the middle of the pulses emitted by the photodiodes of reference reception unit RSA, during a period of signal ECM. The start of each pulse of output signal ADP2 therefore tends to be synchronized on an average pulse emitting time by the photodiodes of reference reception unit RSA.

Signal DPH supplied by comparator CP1 therefore corresponds to the phase-shift of output signal ADP1 with respect to output signal ADP2, i.e., to the time DT1=t4−t1 (FIG. 4B). In practice, signal ECM may have a period around 10 ns, and the convergence on a fixed phase-shift value in delay-locked loop analog circuits ADL1, ADL2, allowing a correct distance measure to be supplied, may be obtained within between 1 and 10 ms at the latest, which corresponds to a number of cycles of signal ECM between 100 000 and 1 million.

An initial adjustment of the phase-shift applied by phase-shifter circuit PHS of each delay-locked loop analog circuit ADL1, ADL2 may be provided. The initial adjustment may be performed by pre-charging capacitor C1 for example to half its maximal voltage in each delay-locked loop analog circuit ADL1, ADL2, or to a voltage corresponding to an average detection distance. The initial adjustment allows a more rapid convergence of the phase-shift produced in each delay-locked loop analog circuit ADL1, ADL2 to be obtained.

When the comparator CP1 receives fixed input phase shifted output signals ADP1, ADP2, the phase shift signal DPH is in the high state at each period of signal ECM for a duration corresponding to the phase-shift between signals ADP1 and ADP2. Comparator CP1 may be a simple logic gate of AND type comprising a first input receiving the output signal ADP1 and a second inverting input receiving the output signal ADP2.

Measuring the duration in the high state of the phase shift signal DPH may be performed by means of a circuit such as duration measurement circuit TMC of FIG. 7. To that end, duration measurement circuit TMC comprises two flip-flops D FF1, FF2, two logic gates of AND type AG3, AG4, and a counter CNT. An output of phase-locked loop circuit PLL2 supplies a clock signal to an input of frequency divider DIVM, and to a clock input of flip-flops FF1, FF2 and counter CNT. An output of frequency divider DIVM is connected to an input D of flip-flop FF1. An output Q of flip-flop FF1 is connected to an input D of flip-flop FF2. Gate AG3 with three direct inputs receives in input the phase-shift signal DPH supplied by comparator CP1 and the signals in output Q of flip-flops FF1, FF2. Gate AG4 comprises a direct input connected to the output Q of flip-flop FF2 and an inverting input connected to the output Q of flip-flop FF1. The output of gate AG3 is connected to a counting input EN of counter CNT. The output of gate AG4 is connected to a reset control input of counter CNT. Counter CNT supplies a count value V representative of the time DT1 between times t1 and t4.

The frequency multiplier coefficient of phase-locked loop circuit PLL2 is chosen different but near that of phase-locked loop circuit PLL1. As an example, if signal CLK has a frequency between 1 and 10 MHz, the multiplier coefficients of phase-locked loop circuits PLL1 and PLL2 may for example be respectively chosen equal to 65 and 66. The output signal of phase-locked loop circuit PLL2 defines a counting frequency. The output signal of frequency divider DIVM defines a counting period between two resets of counter CNT. The coefficient M of frequency divider DIVM is chosen so that the counting period corresponds to at least the smallest common multiplier of the multiplier coefficients chosen for phase-locked loop circuits PLL1 and PLL2.

Counter CNT increments at each rising edge of the output signal of phase-locked loop circuit PLL2 if the output of gate AG3 is in the high state, i.e., if signal DPH is in the high state during a counting phase (output signal of frequency divider DIVM in the high state). Due to the frequency difference between the output signals of phase-locked loop circuits PLL1, PLL2, the rising edges of the output signal of phase-locked loop circuit PLL2, for the counting duration, occur at various times of the period of signal DPH. Thus, over a counting period, the greater the pulse duration in the high state of signal DPH, the more counter CNT increments. The value V of counter CNT at the end of the counting period is representative of the duration in the high state of signal DPH.

Figure 10:
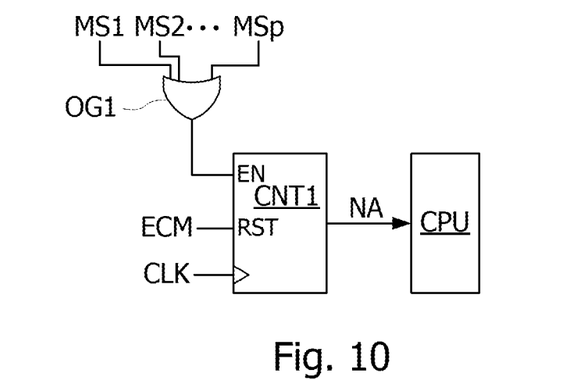
FIG. 10 shows other circuits of the detection device, according to one embodiment.

Process unit PRCU also comprises a central process unit CPU for reading the value of counter CNT at the end of the counting period to determine a value of the distance between an object to be detected and reception unit MSA, see FIG. 10. The circuit of process unit PRCU allows highly accurate measurements to be obtained by means of clock signals at a frequency lower than 1 GHz, complying with the frequencies used in integrated circuits.

It may be provided to perform several counting cycles to measure an object distance, an average of the counts obtained at each of these cycles being calculated to determine a measure of distance.

It may also be provided to offset signal DTH by some periods of the output signal of phase-locked loop circuit PLL1, with respect to the start of a period of the signal in output of frequency divider DIVN, to guarantee that each time signal DTH switches to the high state is counted by counter CNT. The duration of the pulses of signal DTH may also be artificially increased for a more accurate measure of the duration in the high state of this signal, the value of counter CNT at the end of the counting period being adapted accordingly.

According to one embodiment, the central process unit CPU is configured to perform a calibration phase, to determine the contribution of photon reflections on the plate GL, on the measure V of duration DT1 supplied by counter CNT. The phase which is performed in the absence of object O in the detection field DFD, allows a measure of calibration duration to be obtained. If the numbers of photodiodes triggering avalanche in reception unit MSA during the calibration phase and during each measurement phase are not known, duration DT1 may be corrected considering in first approximation that these numbers are identical. The result is that a corrected duration DTC may be obtained by subtracting the calibration duration measure from the double of measure duration time DT1:

$$DTC = 2\,DT1 - DTE \tag{1}$$

where DTE is the measure duration obtained in calibration phase.

If numbers of photodiodes triggering avalanche may be determined or evaluated, during the calibration phase and at each measurement, a corrected duration measure DTC may be calculated as follows:

$$DTC = (NA \times DT1 - NE \times DTE)/(NA - NE) \tag{2}$$

where NA and NE are the numbers of photodiodes avalanche triggering, respectively during the measurement cycle, and the calibration phase.

FIG. 10 shows gate OG1 of process unit PRCU. According to one embodiment, process unit PRCU comprises a counter CNT1 configured to provide central process unit CPU with a count value representative of the number NA of photodiodes in avalanche at each measurement cycle MC. To that end, the counter receives on a clock input signal CLK, on a counting input EN the output signal of gate OG1, and on a reset input signal ECM. It is to be noted that the OR gate (gate OG1) which gathers all the signals from the photodiodes of reception unit MSA, does not make it possible to determine if several photodiode avalanche triggers occur during a same clock cycle CLK. The accuracy of measurements depends on the frequency of clock signal CLK and on the width of the light pulses to be detected.

Counter CNT 1 supplies in calibration phase a value representative of the number NE of photodiodes in avalanche during a calibration measurement cycle. At each distance measurement, the number of photodiodes NA supplied by counter CNT1 may be compared with a threshold value increased by the number NE of photodiodes in avalanche during the calibration phase, and if the number NA is lower than the threshold value increased by the number NE, it is considered that the avalanche triggers during the measurement cycle are due to parasite photons coming in particular from reflections on the plate GL, and therefore no object is in the detection field DFD.

The calibration phase may comprise several measurements, calibration measures DTE and NE used to correct the object distance measures being obtained by calculating an average on several measurement cycles, of the measurements taken in calibration phase. Such a calibration phase may be performed once in factory for each detection device, or periodically, and/or after a particular event such as the powering up of the detection device.

It is to be noted that the distance measurement may be taken without reference reception unit RSA, by directly sending signal ECM to the input of comparator CP1, and not output signal ADP2. For a greater accuracy of the distance measure, the phase-shift measured by output signal ADP2 may be determined once for all and systematically subtracted from phase shift signal DPH. The phase-shift measured by output signal ADP2 may also be taken into account by directly applying a correction to the obtained distance measure.

It will be clear to those skilled in the art that the present disclosure is susceptible of various embodiments and applications. In particular, the disclosure is not limited to a device supplying a distance measure, but may apply to a device only supplying a detection signal indicating the presence or absence of an object near the device. In this case, the reference reception unit RSA is optional. In addition, in some circumstances the transmit time of the incident beam may be determined from the control signal of transmit unit EMU and reference reception unit RSA may be omitted because less accuracy is not problematic.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
  detecting an object in a detection area with a detection device, the detection device having a plurality of single photon avalanche photodiodes, each photodiode having a PN junction having a breakdown voltage, the detection device having a transparent plate between the photodiodes and the detection area, the detecting including:
    generating a bias voltage in a bias voltage generation circuit, the bias voltage being greater than the breakdown voltage of the PN junction of each photodiode;
    reverse biasing the single photon avalanche photodiodes with the bias voltage;
    emitting pulses of an incident photon beam, the pulses of the incident photon beam being configured to generate a reflected photon beam from a reflection on the object;
    detecting ones of the photodiodes avalanche triggering in response to receiving at least one photon of the reflected photon beam;
    determining a distance between the photodiodes and the object in the detection area, as a function of a transmit time of the incident photon beam and an avalanche triggering time in the photodiodes after receiving at least one photon of the reflected beam;
    performing a calibration measurement of the detection area when the detection area is empty;
    determining a correction value based on avalanche triggering in the photodiodes in response to reflections of the incident beam by the transparent plate and based on the calibration measurement; and
    correcting the distance using the correction value by compensating for avalanche triggering in the photodiodes in response to reflections of the incident beam by the transparent plate.

2. The method of claim 1 wherein determining the correction value includes considering when a first number of photodiodes avalanche triggering based on the reflection from on the plate and a second number of photodiodes avalanche triggering from the reflection by the object are equal.

3. The method of claim 1 wherein determining the correction value includes taking into account a number of photodiodes avalanche triggering based on the reflection by the plate, a number of photodiodes avalanche triggering while obtaining the calibration measurement, and a number of photodiodes triggering avalanche based on the reflection by the object.

4. The method of claim 1, comprising measuring a number of photodiodes avalanche triggering during a measurement cycle, and determining if the number of photodiodes to is lower than a threshold value, the threshold value being associated with no object in the detection area.

5. The method of claim 1 wherein determining the distance includes:
  optically coupling a reference set of the single photon avalanche photodiodes to a source of photons emitting the incident photon beam;
  reverse biasing the reference set of photodiodes with the bias voltage;
  determining the average of avalanche triggering time in the reference set of photodiodes, the distance being determined as a function of the average avalanche triggering time in the reference set of photodiodes.

6. The method of claim 1 wherein determining the distance includes:
  generating a first signal at a transmit frequency of the pulses of the incident beam;
  synchronizing a start of each pulse of the first signal on the average avalanche triggering time in the photodiodes;

generating a second signal having a first state during a phase-shift period between the first signal and a third signal at the transmit frequency of the pulses of the incident beam; and when the first signal is synchronized, measuring a duration during which the second signal is in the first state; the distance being determined as a function of the duration.

7. The method of claim 6 wherein the third signal is a control signal configured to control a source that is configured to emit the incident beam.

8. The method of claim 6, further comprising:

determining transmit times of the pulses of the incident beam by synchronizing the third signal to start each pulse based on the average avalanche triggering time of a reference set of photodiodes of a reference unit, the reference set of photodiodes being reverse biased and optically coupled to the source that is configured to emit the incident beam.

9. A device, comprising:

a transmit circuit configured to emit pulses of an incident photon beam toward a detection area, the pulses of the incident photon beam being configured to generate a reflected photon beam from a reflection on an object;

a detection circuit configured to detect the object in the detection area, the detection circuit including a plurality of single photon avalanche photodiodes, each photodiode having a PN junction having a breakdown voltage, the detection device having a transparent plate between the photodiodes and the detection area, the detection circuit being configured to:

reverse bias the photodiodes with a bias voltage that is greater than the breakdown voltage of the PN junction of each photodiode;

detect ones of the photodiodes avalanche triggering in response to receiving at least one photon of the reflected photon beam;

determine a distance between the photodiodes and the object in the detection area, as a function of a transmit time of the incident photon beam and an avalanche triggering time in the photodiodes after at least one photon of the reflected beam is received;

obtain a calibration measurement of the detection area when the detection area is empty;

determine a correction value based on the calibration measurement, the correction value correspondence to avalanche triggering in the photodiodes in response to reflections of the incident beam by the transparent plate by; and correct the distance with the correction value.

10. The device of claim 9, comprising a reference detection circuit comprising a reference set of single photon avalanche photodiodes, optically coupled to the transmit circuit to detect a transmit time of each emitted pulse of the incident beam.

11. The device of claim 10 wherein the transmit circuit is configured to be controlled by a control signal, the device further comprising:

a first synchronization circuit configured to output a first signal and configured to synchronize a start of each pulse of the first signal with an average avalanche triggering time of the photodiodes, the pulses of the incident beam having a transmit frequency and the first signal having the transmit frequency, the synchronization circuit comprising:

a phase shifter configured to receive the control signal;

first and second AND logic gates configured to receive the first signal, the logic gates being configured to receive a detection signal from the reception unit that includes a pulse each time one of the photodiodes avalanche triggers; and a capacitor, the first AND gate being configured to charge the capacitor and the second AND gate being configured to discharge of the capacitor, a voltage across the capacitor being configured to control the phase shifter;

a comparator configured to compare the first signal to a second signal having a frequency of the control signal; and a duration measurement circuit configured to measure a duration in a high state of an output signal of the comparator.

12. The device of claim 11, comprising a second synchronization circuit configured to synchronize a start of each pulse of the second signal having the transmit frequency of the pulses of the incident beam, on an average avalanche triggering time of the reference set of photodiodes of a reference unit that are configured to be reversed biased and optically coupled to the source, to determine transmit times of the pulses of the incident beam.

13. A method, comprising:

determining a distance between an object in a detection area and a detection device, the detection device having a plurality of single photon avalanche photodiodes, the detection device having a transparent plate between the photodiodes and the detection area, the determining of the distance including:

determining a calibration value associated with a number of photodiodes avalanche triggering in response to reflections of an incident photon beam from the transparent plate when the object is not in the detection area;

determining an intermediate measurement associated with a number of photodiodes avalanche triggering in response to reflections of the incident photon beam from the object and the transparent plate; and generating the distance by adjusting the intermediate measurement with the calibration value.

14. The method of claim 13 wherein determining the distance includes detecting a transmit time of the incident photon beam, the transmit time being a time between emission of the incident photon beam from a source and at least one of the photodiodes avalanche triggering in response to a photon from the incident photon beam.

15. The method of claim 13 wherein determining the distance includes comparing the intermediate measurement with a threshold value, the threshold value being associated with parasitic photon reflections from the plate.

16. The method of claim 15, further comprising returning a null signal when the intermediate measurement is lower than the threshold value, the null signal representing no object in the detection area.

* * * * *